United States Patent

Zipser et al.

Patent Number: 5,219,180
Date of Patent: Jun. 15, 1993

[54] TRACTOR WEIGHTS

[75] Inventors: Randall F. Zipser, Lititz; Russell W. Strong; Joseph C. Hurlburt, both of Lancaster, all of Pa.

[73] Assignee: Ford New Holland, Inc., New Holland, Pa.

[21] Appl. No.: 919,453

[22] Filed: Jul. 27, 1992

[51] Int. Cl.⁵ .................................. B60S 11/00
[52] U.S. Cl. ........................ 280/759; 280/758
[58] Field of Search .......... 280/758, 759, 760, 97, 280/98; 212/195; 293/117; 180/900

[56] References Cited

U.S. PATENT DOCUMENTS

| | | | |
|---|---|---|---|
| 3,635,493 | 1/1972 | Barth et al. | 280/759 |
| 3,758,132 | 9/1973 | Elfes et al. | 280/759 |
| 3,944,252 | 3/1976 | Barth | 280/759 |
| 4,094,534 | 6/1978 | Welke et al. | 280/759 |
| 4,462,611 | 7/1984 | Sieren | 280/759 |
| 5,046,577 | 9/1991 | Hurlburt | 280/97 |

Primary Examiner—Richard M. Camby
Attorney, Agent, or Firm—Larry W. Miller; Frank A. Seemar

[57] ABSTRACT

A suitcase weight for use in forming a ballast assembly for the front of an agricultural tractor is disclosed wherein the weight has a body member including a rearward portion adapted for support on a carrier detachably connected to said tractor. Each individual weight further has an upper and lower fastener opening forming a transversely extending passageway for the insertion of a fastener from each side of the ballast assembly for engagement with a fastener strip inserted through flutes formed in the body member and extending vertically from each of the fastener openings. Each weight is thicker at the forward end than at the rearward end to form an arcuate ballast assembly when the weights are clamped together.

19 Claims, 5 Drawing Sheets

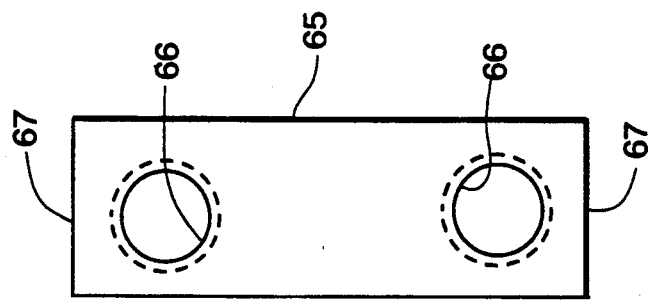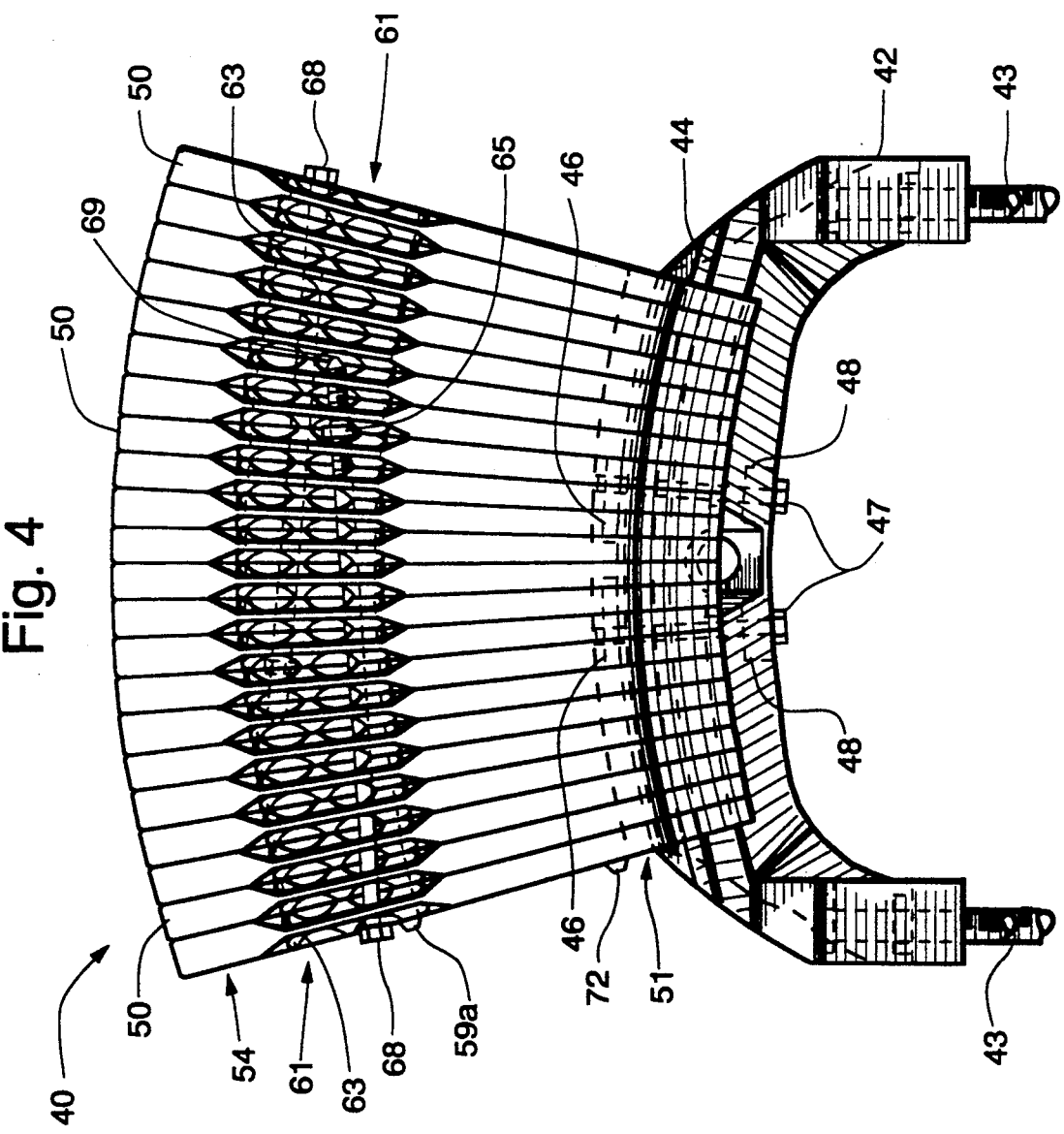

TRACTOR WEIGHTS

BACKGROUND OF THE INVENTION

This invention relates generally to a ballast assembly for such laterally shiftable front axle steering mechanisms and, more particularly, to a suitcase weight permitting the creation of an arcuate ballast assembly added to the front of the tractor.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Although supplemental driving power is often provided to the steerable ground engaging wheels, a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse extension of cylinder rod, causing a turning of the wheels.

Due to physical limitations relating to the range of movement of the steering mechanism and to the eventual interference between the steerable wheels and the steering axle or chassis frame, the amount of pivotal movement of the steerable wheels relative to the steering axle is limited to a given turning angle. This maximum turning angle defines the minimum turning radius of the tractor for a given wheel base length and tread spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These conflicting wheel base requirements can be better resolved by a steering mechanism incorporating a laterally shifting front axle that is movable in response to a corresponding steering movement of the steerable wheels, which will decrease the turning radius of the tractor for any given wheel base length.

Traditionally, the front of the tractor is provided with added ballast or weights to improve weight distribution for the tractor during its operation and, thereby, increase traction for the front steerable wheels. Such weights are normally mounted in a detachable manner to the forward part of the tractor chassis; however, for tractors in which the front axle would shift laterally relative to the chassis, such chassis mounted weights would become unevenly distributed to the steerable wheels since one steerable wheel moves closer to the weights than the other steerable wheel.

It would, therefore, be desirable to provide a ballast assembly usable with a tractor having a laterally shiftable front axle that would maintain a positional relationship between the ballast and the front wheels to which the weight is distributed. Such ballast could be formed from individual weights to create an arcuate ballast assembly with the center of gravity thereof being spaced further away from the front axle than previously known.

SUMMARY OF THE INVENTION

It is an object of this invention to overcome the aforementioned disadvantages of the prior art by providing a tractor weight having a center of gravity forward of the vertical center of the body of the weight.

It is another object of this invention to provide a tractor weight that will maintain an equal distribution of weight on the front steerable wheels whenever the front axle is shifted laterally relative to the chassis.

It is an advantage of this invention that substantially uniform weight distribution of the ballast assembly on the front steerable wheels can be maintained whenever the front axle shifts laterally relative to the chassis.

It is another feature of this invention to provide a tractor ballast assembly having an aesthetically pleasing appearance.

It is still another feature of this invention that the tractor ballast assembly can be easily removed from the front axle of the tractor.

It is still another feature of this invention that a front tractor ballast can be provided with a greater mass at the remote forward end than at the rearward end mounted to the tractor.

It is still another advantage of this invention that the shape of the individual weights places a greater mass at the forward end of the weight.

It is yet another advantage of this invention that the center of gravity of the tractor weight is forward of the centerline of the weight.

It is a further advantage of this invention that the distance between the center of gravity of the mounted weight and the carrier on which the weight is mounted is increased so that the impact of the ballast is increased without increasing the mass of the weights.

It is yet another advantage of this invention that the mounting of the tractor ballast assembly on the front axle improves tire clearance during steering movement of the axle relative to the tractor chassis and/or ballast package.

It is still a further advantage of this invention that the mounting of weights for movement with the axle minimizes tire clearance problems upon steering movement thereof with respect to interference with the ballast.

It is a further feature of this invention that the handle of each individual weight is positioned forwardly of the center of gravity of the weight to allow the weight to swing away from the carrier when lifted by the handle.

It is still a further advantage of this invention that the assembled weight package can be removed from the carrier as a complete unit.

It is yet a further feature of this invention that each individual weight is provided with a chamfer along a rear surface thereof registerable with a rooster cone built into the center of the carrier to restrict the weights against lateral movement relative to the carrier.

It is yet another feature of this invention that the tractor ballast assembly can be mounted on an arcuate rack detachably affixed to the center of the front steerable axle.

It is a further object of this invention to provide a tractor weight cooperable with a laterally shiftable front axle, which is durable in construction, inexpensive of manufacture, carefree of maintenance, facile in assemblage, and simple and effective in use.

These and other objects, features, and advantages are accomplished according to the instant invention by providing a suitcase weight for use in forming a ballast assembly for the front of an agricultural tractor wherein the weight has a body member including a rearward portion adapted for support on a carrier detachably connected to said tractor. Each individual weight further has an upper and lower fastener opening forming a transversely extending passageway for the insertion of a fastener from each side of the ballast assembly for engagement with a fastener strip inserted through flutes formed in the body member and extending vertically from each of the fastener openings. Each weight is thicker at the forward end than at the rearward end to form an arcuate ballast assembly when the weights are clamped together.

BRIEF DESCRIPTION OF THE DRAWINGS

The advantages of this invention will become apparent upon consideration of the following detailed disclosure of the invention, especially when taken into conjunction with the accompanying drawings wherein:

FIG. 4 is an enlarged top plan view of the tractor ballast assembly removed from the front axle of the tractor;

FIG. 8 is an enlarged detail view of the tapped fastener member cooperable with a threaded bolt to clamp the front tractor weights together.

DETAILED DESCRIPTION OF THE PREFERRED EMBODIMENT

Figure 1:
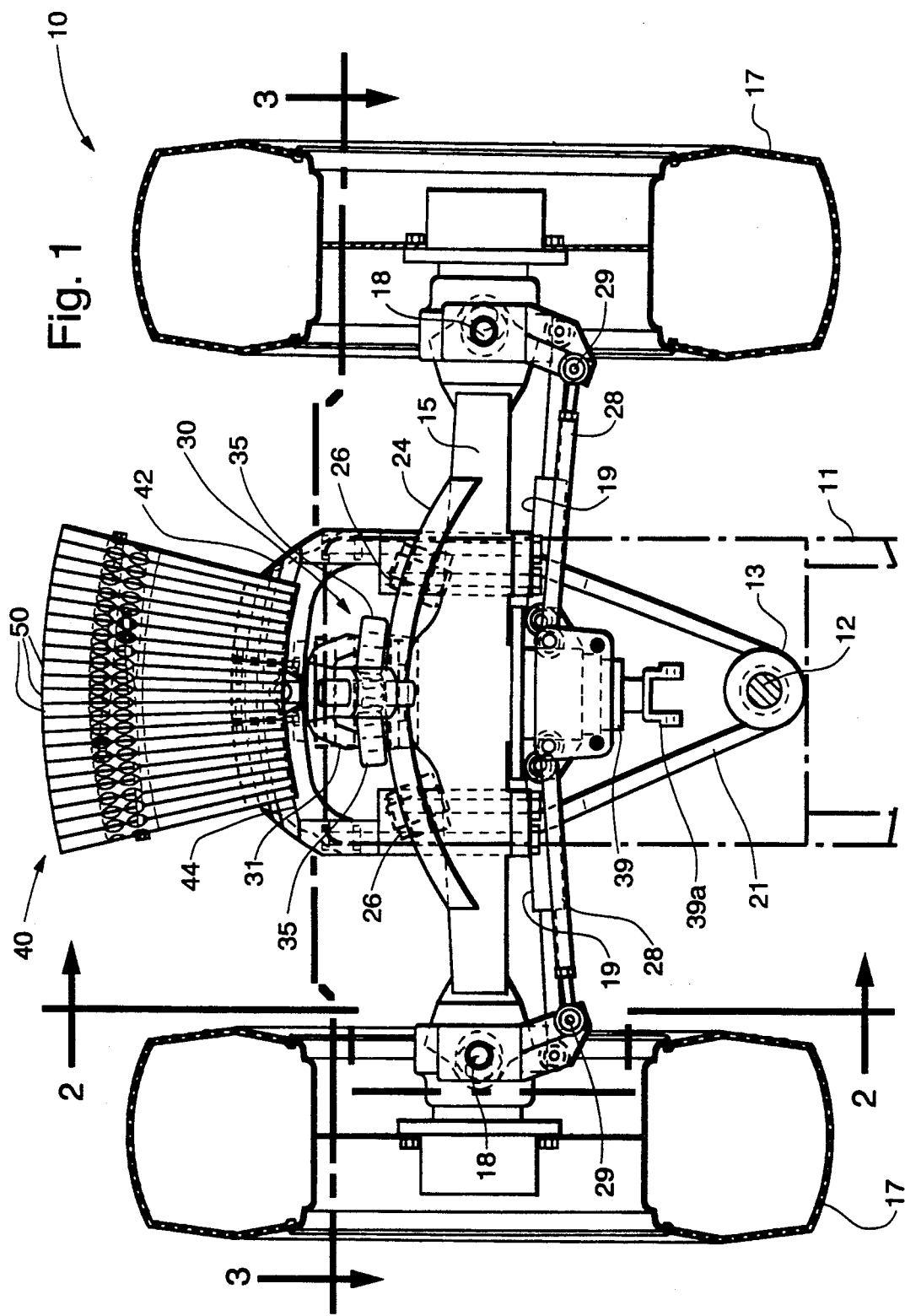
FIG. 1 is a top plan view of a front axle assembly for an agricultural tractor incorporating the principles of the instant invention, the front portion of the tractor chassis overlying the front axle assembly being shown in phantom.
Figure 2:
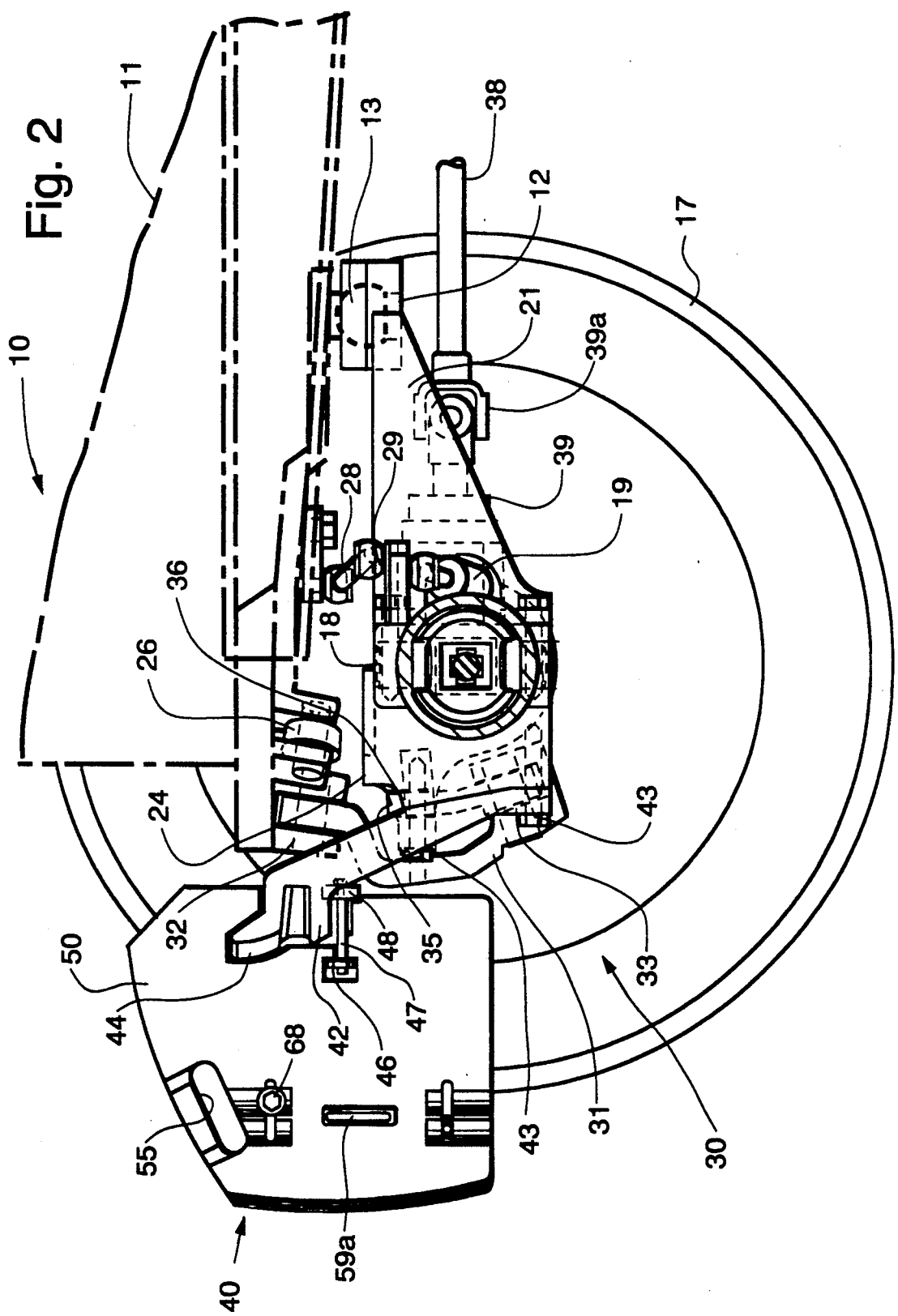
FIG. 2 is a cross-sectional view of the front axle assembly taken along lines 2—2 of FIG. 1, the front portion of the tractor chassis being shown in phantom relative to the front axle assembly.
Figure 3:
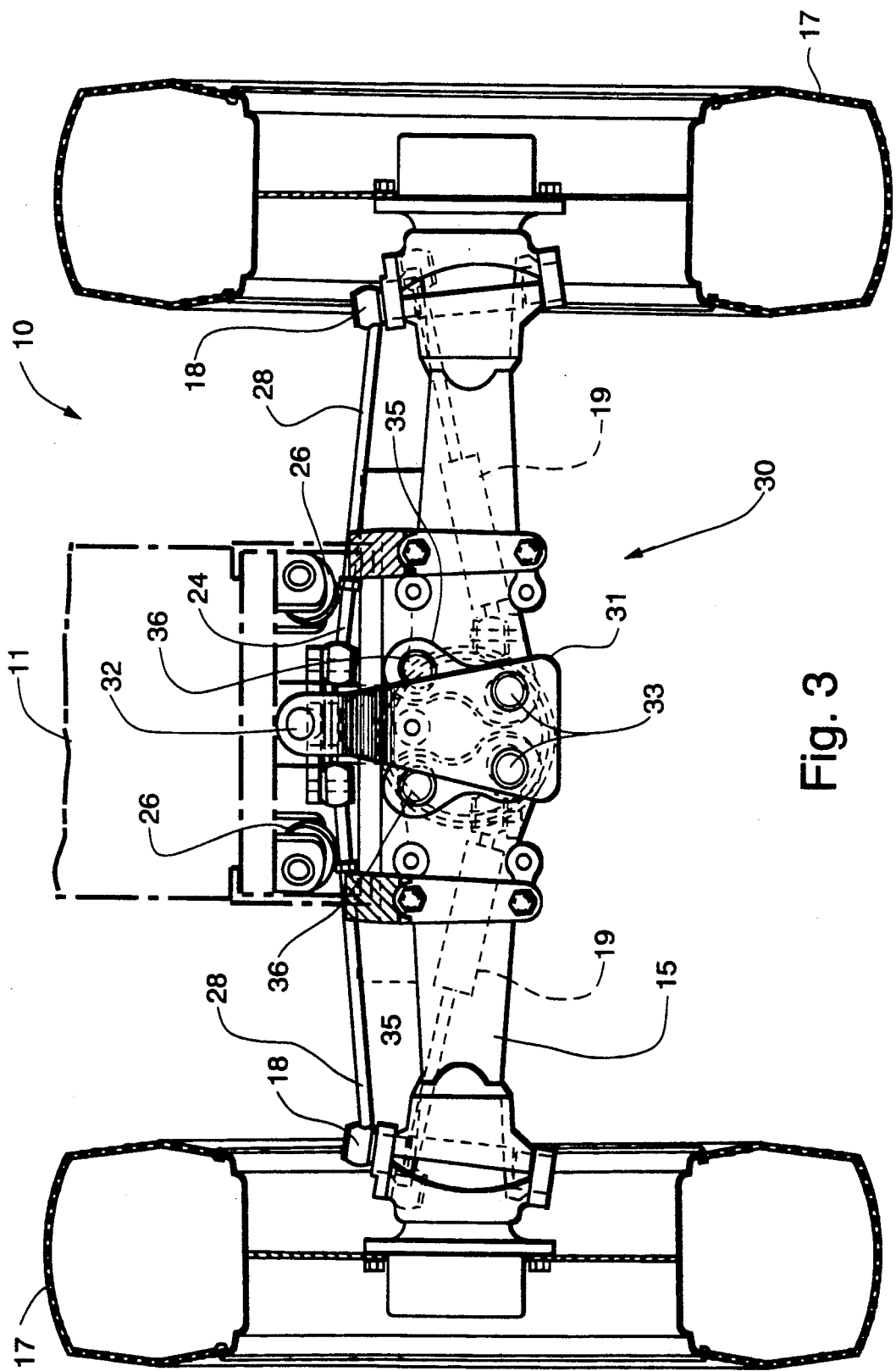
FIG. 3 is a cross-sectional view of the tractor front axle assembly taken along lines 3—3 of FIG. 1 to depict generally a front elevational view of the tractor assembly immediately rearwardly of the weights.

Referring now to FIGS. 1-3, a laterally shifting front axle assembly for an agricultural tractor or other vehicle, pivotally connected to the vehicle chassis to provide a decreased turning radius for an given wheel base, can best be seen. The front axle assembly 10 is pivotally connected to the tractor chassis 11 for pivotal movement about a generally vertical axis 12, thereby allowing the front axle assembly 10 to rotate about the pivot axis 12 and shift the front axle assembly 10 laterally relative to tractor chassis 11. The pivot axis 12 includes a ball joint 13 to permit some oscillatory movement of the front axle 15 relative to the chassis 11. The details of a laterally shiftable front axle assembly to provide better turning capabilities is described in detail in U.S. Pat. No. 5,046,577 issued on Sep. 10, 1991 to Joseph C. Hurlburt, the description of which is incorporated herein by reference.

The front axle assembly i 0 includes a transversely extending axle member 15 having pivotally mounted on the respective laterally opposing ends thereof a pair of steerable wheels 17 pivotable about respective nearly vertical axes 18 to effect a steering of the wheels 17 relative to the axle member 15. A pair of hydraulic cylinders 19 interconnect the axle member 15 and the steerable wheels 17 to control the pivotable movement of the wheels 17 relative to the axle member, and thereby, effect steering.

The front axle member 15 carries a rearwardly extending subframe member 21 which carries the vertical pivot 12 and ball joint 13 connected to the tractor chassis 11 rearwardly of the front axle member 15 yet positioned laterally between the front steerable wheels 17. A front yoke assembly 30 suspends the laterally shiftable front axle member 15 from the forward end of the tractor chassis 11 to permit a pivotal movement of the front axle assembly 10 relative to tractor chassis 11 about the vertical axis 12. To facilitate relative movement between the front axle assembly 10 and the tractor chassis 11 when the axle is fully oscillated, the front axle member 15 is also provided with an arcuate track 24 having a center of curvature coincident with the pivot axis 12. The chassis 11 carries a pair of laterally spaced rollers 26 that are engageable with the arcuate track 24 when the front axle member 15 oscillates generally about a horizontal axis in response to changing ground contours and undulations so that the rollers 26 provide a limit to the vertical movement of the front axle member 15 relative to the tractor chassis 11 due to an engagement thereof with the arcuate track 24.

A pair of tie rods 28 interconnecting the chassis 11 and the steerable wheels 17 transmit steerable movement of the wheels 17 relative to the front axle member 15 and to a lateral shifting movement of the chassis 11 relative to the front axle 15. Although the front axle 15 is pivotally connected to the chassis 111, the front axle 15 is engaged with the ground through the wheels 17 and the actual pivotal movement results in a lateral shifting of the chassis 11. Looking at the front axle 15 from the reference frame of the chassis 11, the appearance is that the axle 15 shifts relative thereto and any reference hereinafter describing the pivotal movement of the front axle member 15 relative to the chassis is so described.

Because of the fixed length of the tie rods 28 interconnecting the chassis 11 and the wheels 17 at a connection point 29 spaced rearwardly from the respective pivot axis or king pin 18 for the corresponding steerable wheel 17, a pivotable movement of the wheel 17 about the corresponding pivot axis 18 will result in a corresponding shifting of the front axle 15 relative to the center (not shown) of a tractor chassis 11, along which the vertical pivot axis 12 is positioned.

The front yoke assembly 30 has a contoured front strap member 31 pivotally connected at a first pivot 32 to the chassis 11. The front strap member 31 also carries a pair of lower pivots 33 for pivotally supporting a corresponding pair of dog bone-shaped links 35 which, in turn, are pivotally connected to the front axle member 15 by respective pivots 36. Each of the pivots 32, 33, 36 associated with the front yoke assembly 30 have a corresponding pivot axis aligned with the ball joint 13 forming a part of the pivot axis 12 between the front axle assembly 10 and the tractor chassis 11 Accordingly, the pivot axis for each of the five pivots 32, 33, 36 have a nonparallel relationship intersecting a common point at the ball joint 13. As a result, the pivotal movement of the front axle assembly 10 relative to the tractor chassis 11, resulting in a lateral shifting of the front axle member 15, is accomplished through a four-bar linkage which has substantially no vertical component associated with the movement thereof.

As depicted in FIGS. 1-3, the front axle assembly 10 may be powered in a conventional manner from the transmission (not shown) carried by the tractor chassis 11 through the front wheel drive shaft 38 connected to a conventional front wheel drive mechanism 39 to operatively power the rotation of the steerable wheels 15 to facilitate movement of the tractor chassis 11 over the ground. One skilled in the art will readily realize that the provision of a front wheel drive mechanism 39 is optional and independent of the operation of the compound steering mechanism permitting a lateral shifting of the tractor chassis 11 relative to the front axle member 15. The continuous driving of the front wheels 17 during steering operation to the front axle member 15 can be accommodated by the universal joint 39a interconnecting the front wheel drive mechanism 39 and the drive shaft 38.

In accordance with the principles of the instant invention, it can be seen in FIGS. 1-4 that the tractor ballast assembly 40 is carried by the front axle assembly 10 intermediate of the steerable wheels 17 at a position centrally therebetween. A carrier 42 is detachably connected by fasteners 43 to the front axle member 15 to extend forwardly thereof and forwardly of the tractor chassis 11, as well. The carrier 42 is provided with an arcuate mounting ring 44 upon which individual suitcase weights 50 are supported. Since the carrier 42 moves with the front axle member 15 relative to the chassis 11, the position of the ballast assembly 40 relative to the laterally spaced front wheels 17 remains relatively fixed, thereby maintaining a substantially constant weight distribution relative to the front wheels 17. Furthermore, since the ballast assembly 40 moves with the axle member 15, the steering clearance between the pivotally movable wheels 17 and the ballast assembly 40 does not change as the front axle 15 shifts laterally and/or oscillates vertically. As a result, the operator may mount additional weight units 50 to increase the amount of ballast on the front axle 15 without decreasing the tire clearance below that which is acceptable for traditional tractors.

Figure 5:
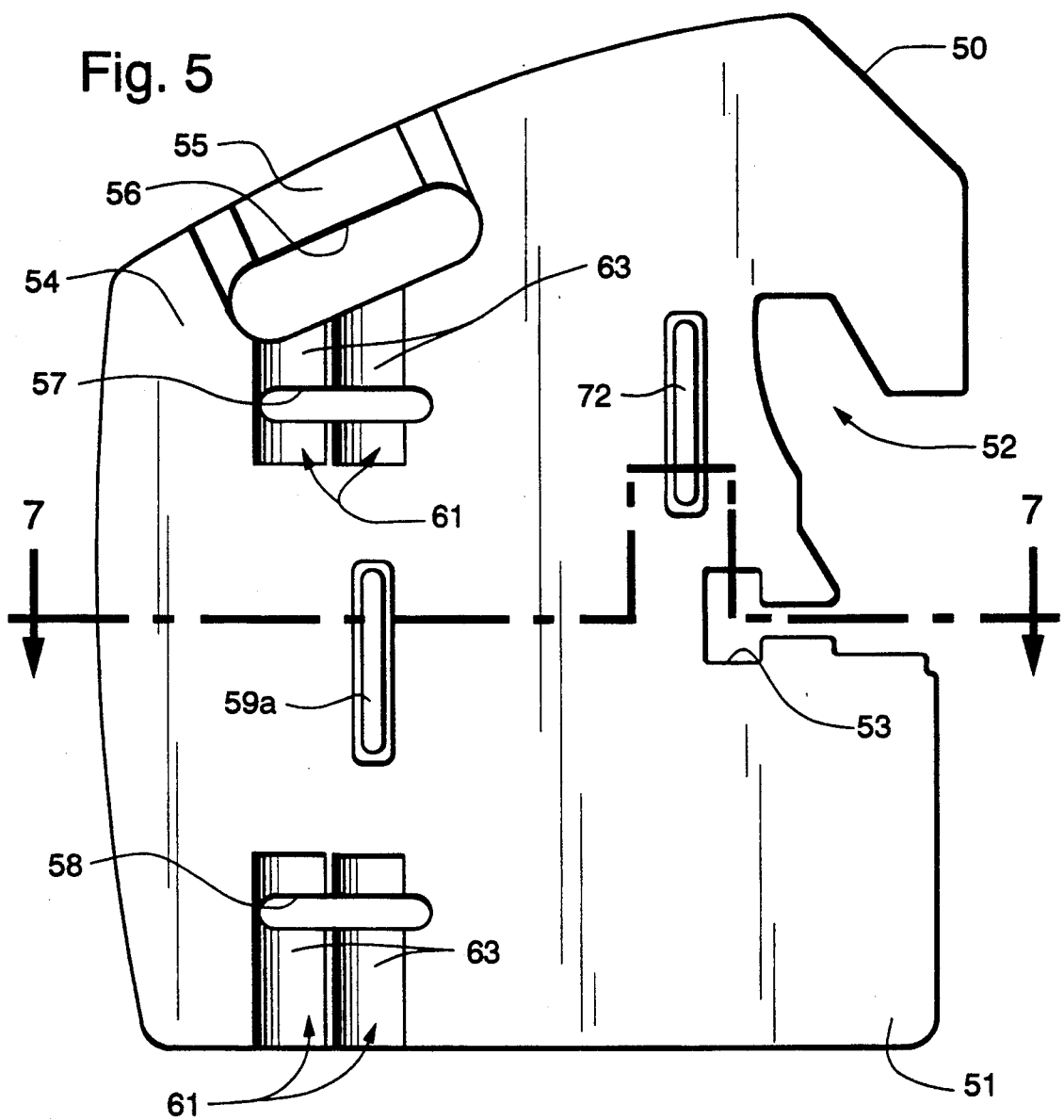
FIG. 5 is a side elevational view of a single suitcase weight forming a part of the tractor ballast assembly.
Figure 6:
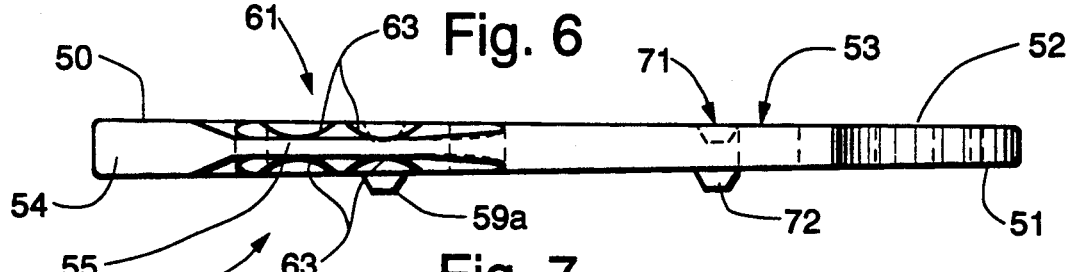
FIG. 6 is a top plan view of the suitcase weight shown in FIG. 5.
Figure 7:
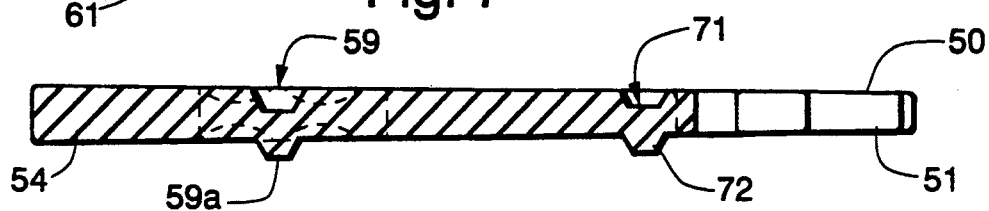
FIG. 7 is a cross-sectional view taken along lines 7—7 of FIG. 5 through the central portion of the suitcase weight.

The individual suitcase weights 50 are best seen in FIGS. 5-7. Each weight 50 has a rearward end 51 having a specially contoured opening 52 therein to correspond to the carrier 42 and mounting ring 44 to permit the weight 50 to be properly supported thereon. Each weight 50 is also provided with a forward portion 54 associated with a fastener mechanism to connect the individual weights together and form a unitary ballast package mounted on the carrier 42. As best seen in FIGS. 4, 6, & 7 the forward portion 54 of each weight 50 is thicker in cross section than the rearward portion 51 which, when mounted on the arcuate mounting ring 44, presents a laterally curved ballast assembly 40, best seen in FIG. 4. Accordingly, the forward portion 54 of each weight 50 has a greater mass than the thinner rearward portion 51 and, therefore, the center of gravity of each weight 50 is forwardly of the physical center of the weights.

Each individual weight 50 has a handle portion 55, including first opening 56 extending therethrough, to provide a handle by which the weight 50 can be grasped and carried from place to place. Each weight 50 is also provided with a transverse upper fastener opening 57 and a transverse lower fastener opening 58, both of which are in the form longitudinally extending slots. Each weight 50 is further provided with a detent 59 in one vertical face and a corresponding projection 59a on the opposing vertical face to provide a means for interlocking adjacent weights through the interengagement of the projection 59a on one weight into the corresponding detent 59 on the adjacent weight 50, when assembled into the ballast assembly 40. The contoured opening 52 in the rearward portion 51 of each weight 50 is provided with a rearward fastener opening 53 extending transversely through the weight to facilitate the mounting of an assembled plurality of weights 50 on the carrier 42 as will be described in greater detail below.

The weights 50 are also provided with a pair of adjacent vertically extending flutes 61 associated with each of the upper and lower fastener openings 57, 58 and incorporated into both sides of the weight 50. Each of the flutes 61 extend to the vertically nearest surface of the weight 50 to permit access to the interior of the ballast assembly 40, for purposes to be described in greater detail below. In the instances of the flutes 61 associated with the upper fastener opening 57, the handle portion 55 defines a recessed portion of the weight 50, as best depicted in FIG. 6, such that the flutes 61 need only extend to the handle opening 56 to provide sufficient access to the upper fastener opening 57. Each flute 61 has a vertically oriented arcuate surface 63.

Referring now to the detail view of FIG. 8, a fastener strip 65 used to clamp the weights 50 together can best be seen. The fastener strip 65 is an elongated metal strip having a pair of tapped holes 66 formed in the opposing ends 67 of the strip 65. The holes 66 are positioned relative to the respective ends 67 of the strip 65 such that the strip 65 can be inserted into the flutes 61 to position one of the holes 66 in substantial alignment with the corresponding fastener opening 57, 58. Each fastener strip 65 is provided with two holes 66 to provide greater flexibility in use of the strip 65, such that no particular care needs to be taken to insert the strip 65 into the flute 61 in the proper orientation, unless one of the holes 66 have been damaged.

To clamp the weights 50 together, preferably after the weights 50 have been supported on the carrier 42, a long threaded fastener 68 is inserted generally horizontally through the upper fastener opening 57 from one side of the ballast assembly 40 and threaded into the corresponding tapped hole 66 in a fastener strip 65 inserted downwardly through one of the flutes. The threaded fastener 68 is provided with a conical tip 69 to assist in seeking the hole 66 in the strip 65. The fastener 68 is then threaded into the tapped hole 66 until tightened. Because of the arcuate shape of the ballast assembly 40, the fastener 68 may not be able to extend entirely through the ballast assembly 40, depending on the overall size of the assembled weight package, requiring the insertion of the fastener strip 65 in a flute corresponding to an intermediate weight 50 in the ballast assembly 40. One skilled in the art will realize that the fastener must clamp together more than half the weights 50.

To complete the assembly of the ballast assembly 40, a second fastener 68 must be inserted through the upper fastener opening 57 from the opposite side of the ballast assembly 40 and engaged with a corresponding fastener strip 65, the two fasteners overlapping several weights 50 at the center of the ballast assembly 40. Similarly, a pair of fasteners 68 are inserted through the lower fastener opening 58 from opposing sides of the ballast assembly 40 to engage fastener strips 65 inserted upwardly into appropriate flutes 61. The utilization of four such fasteners 68 clamps the weights 50 together to form a unitary package.

The provision of an arcuate surface 63 for each flute 61 allows the fastener strip 65 and an appropriate washer associated with the head of the threaded fastener 68 to seek an equilibrium position in proper alignment with the fastener 68. The specific orientation of the fastener strip 65 relative to the arcuate surface 63 of the corresponding flute 61 will necessarily vary depending on the number of weights 50 clamped by the corresponding fastener 68. A full tightening of the fastener 68 may result in a coining of the fastener strip 65 and any washer used with the fastener 68 to match the shape of the arcuate surface 63.

Each weight 50 is also provided with a clamp opening 53, which may form a part of the contoured opening 52, extending generally horizontally through the weight 50. As with the upper and lower fastener openings 57, 58, the clamp opening 53 forms an arcuate passageway through the assembled ballast assembly 40. A clamping strip 46 laterally inserted horizontally through the passageway defined by the adjacent clamp openings 53 will position a tapped hole for engagement with a clamping bolt 47 positioned below the carrier 42. A clamping block 48 associated with the clamping bolt 47 can be utilized to better engage the carrier 42. Preferably, at least two clamping bolts 47 will be utilized to firmly clamp the assembled weights 50 to the carrier 42. Optionally, the clamping strip 46 can be a single arcuate strip having a pair of tapped holes therein for engagement with a pair of clamping bolts 47 to provide some cooperative relationship therebetween.

One skilled in the art will readily realize that a ballast assembly constructed of such individual weights clamped together will result in an arcuate-shaped ballast assembly with the larger forward portions being spaced away from the front axle. As a result the center of gravity of the ballast assembly will be spaced more forwardly than with conventional ballast assemblies to give a greater impact of the weights due to a longer moment arm between the center of gravity and the front axle. Accordingly, such a ballast assembly will provide a greater ballasting effect for each pound of weight. The arcuate-shaped ballast assembly also improves tire clearance because of the narrower width of the ballast assembly being adjacent the tractor where the tires would normally interfere with the ballast package.

It has been found that a better shipping of a group of individual weights can be accomplished by alternating weight orientation and binding the weights 50 together. As a result, the stacked individual weights 50 will not form an arcuate shape, but rather a linear one. As shown in FIGS. 5-7, each weight 50 can be provided with an optional second detent 71 and corresponding projection 72 formed in the rearward portion 51 forwardly of the contoured opening 52. As with the first detent 59 and corresponding projection 59a, the interengagement of a projection 72 with an adjacent detent 71 helps to stabilize the ballast assembly 40. By forming the second detent 71 and corresponding projection 72 in the body of the weight 50 at a position relative to the top and rear of the weight 50 to correspond to the position of the first detent 59 and first projection 59a relative to the bottom and front of the weight 50, the weights 50 stacked for shipment will have the first projection 59a received by the second detent 71 and, conversely, the second projection 72 received by the first detent 59, thereby making the most compact package possible for shipment. Furthermore, the vertical and horizontal staggering of the two projections 59a, 72 provides a better interlocking relationship between adjacent weights 50.

One skilled in the art will readily realize that the mounting of the weights directly to the laterally shiftable axle will enable the ballast to be maintained centrally between the front wheels of the tractor as it makes turns, effecting a lateral shifting of the tractor chassis relative to the front axle. One skilled in the art will also realize that this invention is not limited in use to agricultural tractors, but is applicable to any vehicle which can incorporate a laterally shiftable front axle and requires a detachable front ballast. The assembled weights form a ballast assembly having an aesthetically pleasing arcuate shape visually indicative of the lateral shifting of the axle and attached weights. The physical structure of each weight lends to the ease of assembling the weights and of mounting the assembled weights on the carrier and to the ease of shipping such weights.

One skilled in the art will further realize that the concept of mounting a ballast assembly as described above on the front axle of a conventional steering tractor will provide improved oscillation clearance, since the ballast assembly will be oscillating with the axle, and will also reduce loading on the conventional oscillation pins connecting the axle to the tractor chassis because the weight of the ballast package will be bearing directly on the front axle through its supporting structure, rather than through the oscillation pins.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A tractor weight comprising a body member having a height dimension, a width dimension and a thickness dimension extending substantially perpendicularly to both said height and width dimensions and being significantly smaller than either of said height and width dimensions, said body member including a rearward portion having an opening therethrough of a configuration corresponding to a carrier upon which said weight is to be mounted and a forward portion having the thickness dimension greater than the thickness dimension of said rearward portion, the thickness dimension of said body member decreasing from said forward portion to said rearward portion, said body member being cooperable with fastener means for clamping adjacent weights together to form a ballast assembly.

2. The tractor weight of claim 1 wherein said body member further has a pair of vertically spaced fastener openings formed as elongated slots oriented in a fore-and-aft direction.

3. The tractor weight of claim 2 wherein said body member further includes at least one generally vertically extending flute associated with each said fastener opening.

4. The tractor weight of claim 3 wherein the upper said fastener opening has a pair of flutes extending upwardly therefrom on each opposing side of said body member.

5. The tractor weight of claim 4 wherein the lower said fastener opening has a pair of flutes extending downwardly therefrom on each opposing side of said body member.

6. The tractor weight of claim 3 wherein said body member further includes an outwardly extending projection on one side thereof and a corresponding detent on the opposing side thereof.

7. The tractor weight of claim 6 wherein said body member further includes a second outwardly extending projection on said one side and a corresponding second detent on said opposing side, said second projection being symmetrically oriented with respect to said first projection about a line of symmetry.

8. The tractor weight of claim 6 wherein said body member further includes a handle portion including a handle opening extending transversely therethrough.

9. The tractor weight of claim 8 wherein the upper said fastener opening has a pair of flutes extending upwardly therefrom on each opposing side of said body member, said pair of flutes aligning with said handle portion.

10. A tractor ballast assembly comprising:
a plurality of individual weights, each said weight including a rearward portion having a contoured opening therethrough of a configuration corresponding to a carrier upon which said ballast assembly is to be mounted and a forward portion having a cross-sectional thickness greater than a cross-sectional thickness of said rearward portion, the cross-sectional thickness of said weight decreasing from said forward portion to said rearward portion, each said weight further having a pair of fastener openings extending transversely therethrough for the insertion of fastener means for clamping adjacent said weights together, said weights being positioned adjacent one another with said rearward portions being positioned contiguously to form an arcuate configuration with corresponding said fastener openings being aligned to form corresponding fastener passageways extending transversely through said ballast assembly;
fastener means associated with each said fastener passageway to clamp said adjacent weights together; and
clamping means interengaging said clamped weights and said carrier to detachably affix said weights to said carrier.

11. The ballast assembly of claim 10 wherein said fastener openings are vertically spaced and are formed as elongated slots oriented in a fore-and-aft direction, each said weight further including a pair of flutes extending vertically relative to each said fastener opening.

12. The ballast assembly of claim 11 wherein said fastener means includes a threaded fastener inserted through each of said fastener passageways and being engageable with a fastener strip inserted into one of said flutes.

13. The ballast assembly of claim 12 wherein said fastener means includes a pair of threaded fasteners inserted into each said fastener passageway from opposing sides of said ballast assembly, each fastener of said pair of fasteners being engaged with a corresponding fastener strip and being operable to clamp together more than half of said individual weights.

14. The ballast assembly of claim 13 wherein each said weight further includes an outwardly extending projection on one side thereof and a corresponding detent on the opposing side thereof, said ballast assembly having a projection of one individual weight inserted into the detent of the adjacent weight to interlock said individual weights.

15. The ballast assembly of claim 14 wherein each said weight further includes a second outwardly extending projection on said one side and a corresponding second detent on said opposing side, said second projection being symmetrically oriented with respect to said first projection about a line of symmetry, such that an inversion of alternate weights would enable said second projection to be engageable with said first detent and said first projection to be engageable with said second detent.

16. The ballast assembly of claim 15 wherein each said weight further includes a handle portion including a handle opening extending transversely therethrough, the upper said fastener opening having a pair of flutes extending upwardly therefrom on each opposing side of said body member, said pair of flutes aligning with said handle portion.

17. The ballast assembly of claim 16 wherein each said fastener strip is provided with a pair of tapped holes adjacent, respectively, the opposing ends of said fastener strip, each said tapped hole being positioned relative to the corresponding said end such that one of said tapped holes is aligned with the corresponding said fastener passageway when said fastener strip is inserted into said flutes.

18. The ballast assembly of claim 17 wherein said contoured opening defines a clamping opening in said rearward portion of each said individual weight forming a transversely extending arcuate clamping passageway through said ballast assembly, said clamping means including a clamping strip insertable through said clamping passageway, said clamping strip having a tapped hole therein, said clamping means further including a clamping bolt interengaging said carrier and said clamping strip to detachably affix said ballast assembly to said carrier.

19. The ballast assembly of claim 18 wherein said clamping means includes a pair of laterally spaced clamping bolts engageable with a clamping strip provided with a corresponding pair of tapped holes therein for engagement with said clamping bolts.

* * * * *